(12) United States Patent  
Fujita et al.

(10) Patent No.: US 12,394,567 B2  
(45) Date of Patent: Aug. 19, 2025

(54) MULTILAYER CERAMIC CAPACITOR INCLUDING VIA-CONDUCTORS AND OUTER ELECTRODES

(71) Applicant: Murata Manufacturing Co., Ltd., Nagaokakyo (JP)

(72) Inventors: Yukihiro Fujita, Nagaokakyo (JP); Yohei Yamaguchi, Nagaokakyo (JP); Seiji Hidaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 179 days.

(21) Appl. No.: 18/220,896

(22) Filed: Jul. 12, 2023

(65) Prior Publication Data

US 2023/0360854 A1  Nov. 9, 2023

Related U.S. Application Data

(63) Continuation of application No. PCT/JP2022/013409, filed on Mar. 23, 2022.

(30) Foreign Application Priority Data

Apr. 16, 2021 (JP) .................. 2021-069605

(51) Int. Cl.
*H01G 4/224* (2006.01)
*H01G 4/008* (2006.01)
(Continued)

(52) U.S. Cl.
CPC ............. *H01G 4/008* (2013.01); *H01G 4/224* (2013.01); *H01G 4/232* (2013.01); *H01G 4/30* (2013.01)

(58) Field of Classification Search
CPC ........ H01G 4/2325; H01G 4/224; H01G 4/30; H01G 4/232
See application file for complete search history.

(56) References Cited

U.S. PATENT DOCUMENTS

2006/0092595 A1  5/2006  Hwa Lee et al.
2007/0121273 A1*  5/2007  Yamamoto ............. H01G 4/232
                                                257/E23.07
(Continued)

FOREIGN PATENT DOCUMENTS

JP   2006135333 A   5/2006
JP   2009295687 A   12/2009

OTHER PUBLICATIONS

International Search Report in PCT/JP2022/013409, mailed Jun. 21, 2022, 3 pages.

(Continued)

*Primary Examiner* — David M Sinclair
(74) *Attorney, Agent, or Firm* — Keating & Bennett, LLP

(57) ABSTRACT

A multilayer ceramic capacitor includes a capacitor body, first and second via-conductors, first and second extended electrode portions, first and second outer electrodes, and an insulative resin. The capacitor body includes first and second inner electrodes. The first and second via-conductors are inside the capacitor body, and are respectively electrically connected to the first and second inner electrodes. The first and second extended electrode portions are respectively electrically connected to the first and second via-conductors. The first and second extended electrode portions are located on an outer surface of the capacitor body so as to extend to locations different from locations at which the first and second extended electrode portions are connected to the first and second via-conductors. The first and second outer electrodes are respectively electrically connected to the first and second extended electrode portions.

20 Claims, 10 Drawing Sheets

(51) Int. Cl.
*H01G 4/232* (2006.01)
*H01G 4/30* (2006.01)

(56) References Cited

U.S. PATENT DOCUMENTS

| | | | | |
|---|---|---|---|---|
| 2008/0037199 | A1* | 2/2008 | Fukudome | H05K 1/185 29/25.42 |
| 2010/0020465 | A1* | 1/2010 | Fukudome | H01G 4/232 29/25.42 |
| 2010/0300740 | A1* | 12/2010 | Ichiyanagi | H05K 1/0231 361/321.2 |
| 2011/0157763 | A1* | 6/2011 | Yamamoto | H01G 4/232 361/301.3 |
| 2017/0290163 | A1* | 10/2017 | Hirota | H01G 4/1236 |

OTHER PUBLICATIONS

Written Opinion in PCT/JP2022/013409, mailed Jun. 21, 2022, 3 pages.

* cited by examiner

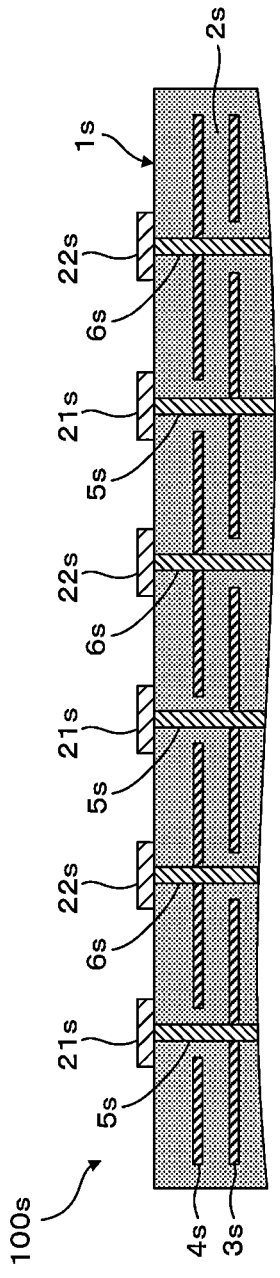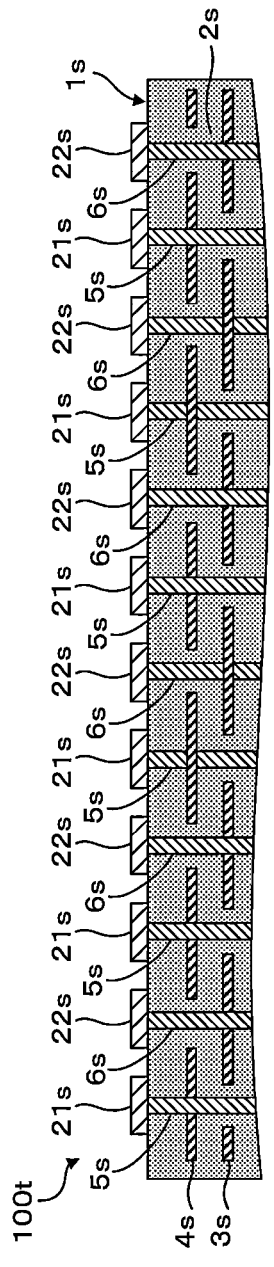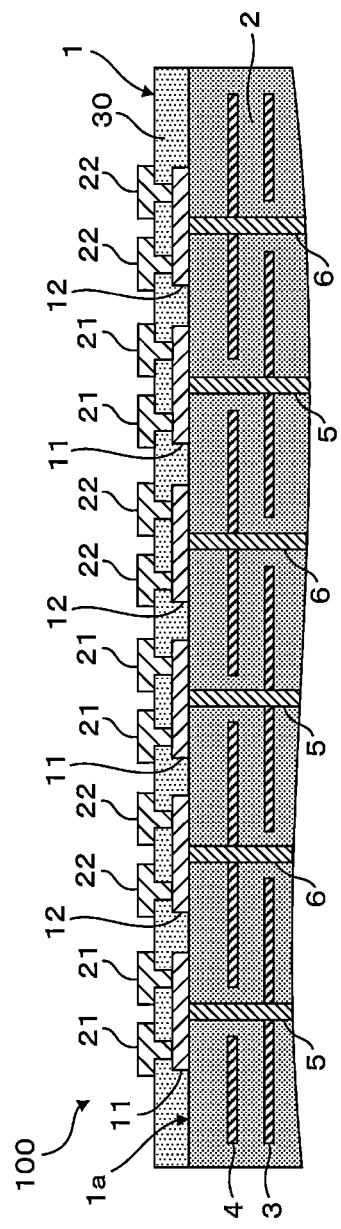
FIG. 9A
FIG. 9B
FIG. 9C

MULTILAYER CERAMIC CAPACITOR INCLUDING VIA-CONDUCTORS AND OUTER ELECTRODES

CROSS REFERENCE TO RELATED APPLICATIONS

This application claims the benefit of priority to Japanese Patent Application No. 2021-069605 filed on Apr. 16, 2021 and is a Continuation application of PCT Application No. PCT/JP2022/013409 filed on Mar. 23, 2022. The entire contents of each application are hereby incorporated herein by reference.

BACKGROUND OF THE INVENTION

1. Field of the Invention

The present invention relates to a multilayer ceramic capacitor.

2. Description of the Related Art

Multilayer capacitors with reduced equivalent series inductance (ESL) are known. The ESL of such a multilayer capacitor is reduced by methods, such as increasing the thickness of a route through which current flows, decreasing the length of a route through which current flows, or causing magnetic fields generated by currents of different polarities to cancel each other out. Japanese Unexamined Patent Application Publication No. 2006-135333 discloses an exemplary multilayer capacitor with reduced ESL.

The multilayer capacitor disclosed in Japanese Unexamined Patent Application Publication No. 2006-135333 includes a capacitor body in which a plurality of dielectric layers, a plurality of first inner electrodes, and a plurality of second inner electrodes are stacked. The capacitor body includes a plurality of first via-conductors, and a plurality of second via-conductors. The first via-conductors are electrically connected to the first inner electrodes, and extend to one major surface of the capacitor body. The second via-conductors are electrically connected to the second inner electrodes, and extend to the one major surface of the capacitor body. The one major surface of the capacitor body is provided with a plurality of first outer electrodes, and a plurality of second outer electrodes. Each first outer electrode is electrically connected to the corresponding first via-conductor. Each second outer electrode is electrically connected to the corresponding second via-conductor.

In the multilayer capacitor disclosed in Japanese Unexamined Patent Application Publication No. 2006-135333, each first outer electrode is provided at a location where the corresponding first via-conductor is exposed on the one major surface of the capacitor body, and each second outer electrode is provided at a location where the corresponding second via-conductor is exposed on the one major surface of the capacitor body. A potential issue with this configuration is the inability to provide the first and second outer electrodes at any desired locations on the major surface.

SUMMARY OF THE INVENTION

Preferred embodiments of the present invention provide multilayer ceramic capacitors that each enable first and second outer electrodes to be provided at any desired locations.

A multilayer ceramic capacitor according to a preferred embodiment of the present invention includes a capacitor body including a plurality of dielectric layers, a plurality of first inner electrodes, and a plurality of second inner electrodes that are stacked, a first via-conductor inside the capacitor body and electrically connected to the first inner electrodes, a second via-conductor inside the capacitor body and electrically connected to the second inner electrodes, a first extended electrode portion electrically connected to the first via-conductor and provided on an outer surface of the capacitor body such that the first extended electrode portion extends to a location different from a location at which the first extended electrode portion is connected to the first via-conductor, a second extended electrode portion electrically connected to the second via-conductor and provided on the outer surface of the capacitor body such that the second extended electrode portion extends to a location different from a location at which the second extended electrode portion is connected to the second via-conductor, a first outer electrode electrically connected to the first extended electrode portion, a second outer electrode electrically connected to the second extended electrode portion, and an insulative resin providing insulation between the first extended electrode portion and the second extended electrode portion, and between the first outer electrode and the second outer electrode.

In multilayer ceramic capacitors according to preferred embodiments of the present invention, the first outer electrode is electrically connected to the first extended electrode portion, which is provided on an outer surface of the capacitor body such that the first extended electrode portion extends to a location different from where the first extended electrode portion is connected to the first via-conductor, and the second outer electrode is electrically connected to the second extended electrode portion, which is provided on the outer surface of the capacitor body such that the second extended electrode portion extends to a location different from where the second extended electrode portion is connected to the second via-conductor. This makes it possible to provide the first outer electrode at a location different from where the first via-conductor is exposed on the outer surface of the capacitor body, and to provide the second outer electrode at a location different from where the second via-conductor is exposed on the outer surface of the capacitor body.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 9A to 9C are illustrations for explaining that a multilayer ceramic capacitor according to a preferred embodiment of the present invention makes it possible to reduce a decrease in electrostatic capacitance even when the number of outer electrodes increases, of which FIG. 9A schematically illustrates, in cross-section, the structure of a conventional multilayer ceramic capacitor in which first outer electrodes are disposed at locations where the corresponding first via-conductors are exposed on an outer surface of a capacitor body, and in which second outer electrodes are disposed at locations where the corresponding second via-conductors are exposed on the outer surface of the capacitor body, FIG. 9B schematically illustrates, in cross-section, the structure of a conventional multilayer ceramic capacitor in which the respective numbers of first and second outer electrodes are doubled compared with the multilayer ceramic capacitor illustrated in FIG. 9A, and FIG. 9C schematically illustrates, in cross-section, the structure of a multilayer ceramic capacitor according to a preferred embodiment of the present invention.

DETAILED DESCRIPTION OF THE PREFERRED EMBODIMENTS

Preferred embodiments of the present invention are described below to describe specific features of the present invention.

Figure 1:
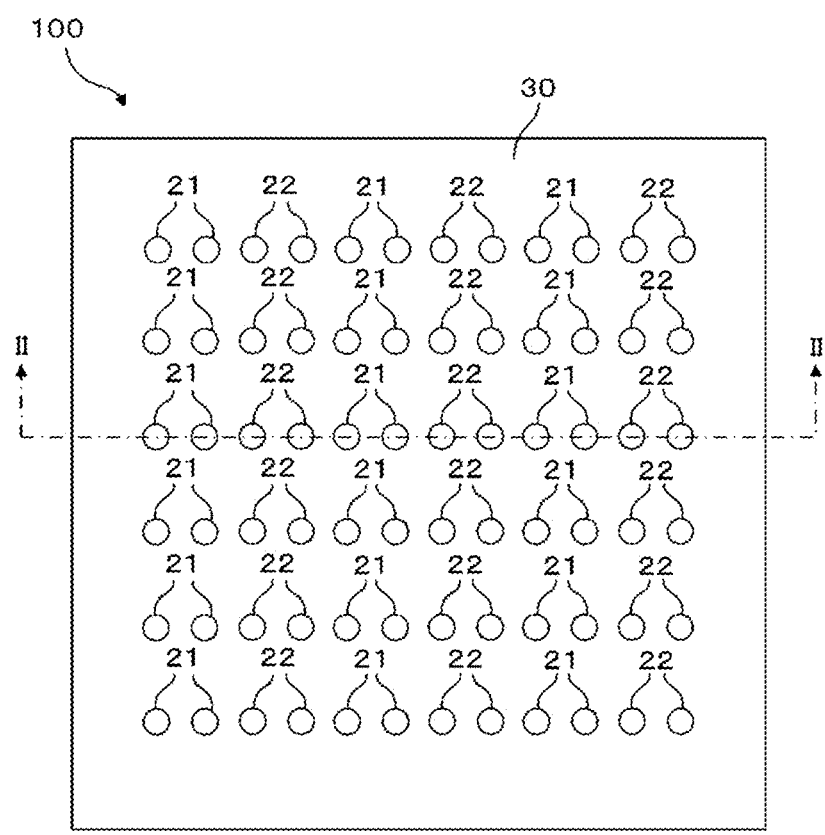
FIG. 1 is a plan view of a multilayer ceramic capacitor according to a preferred embodiment of the present invention.
Figure 2:
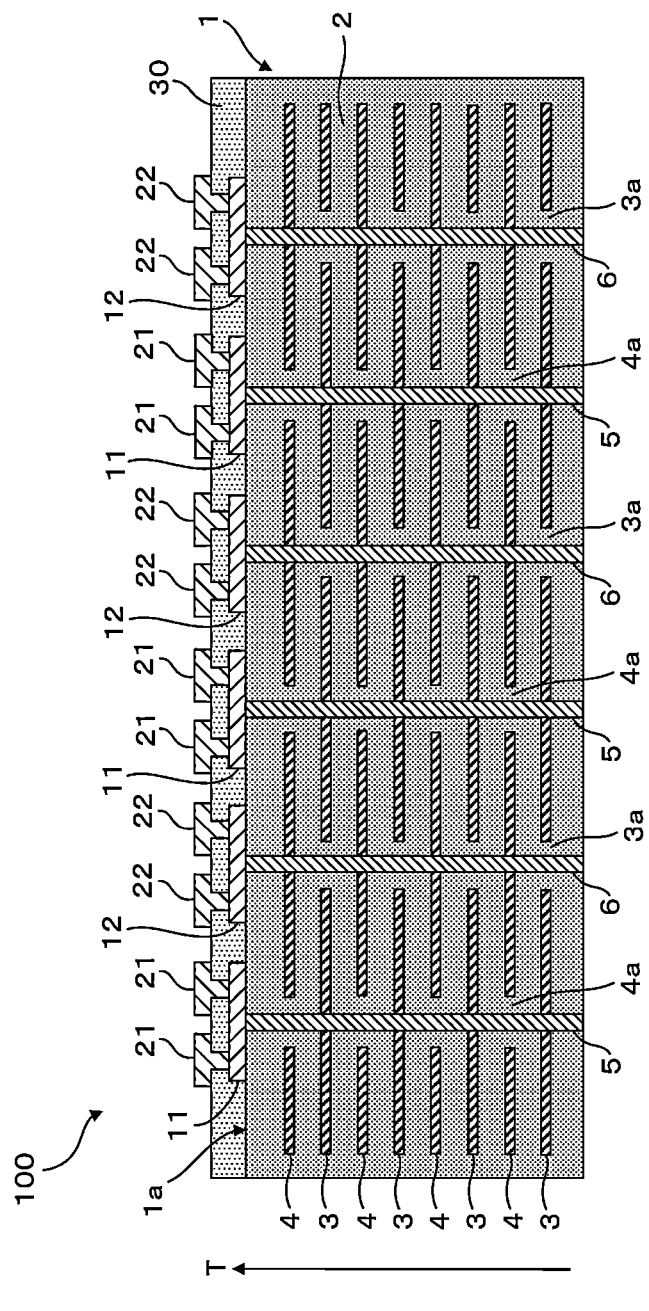
FIG. 2 is a cross-sectional view, taken along a line II-II, of the multilayer ceramic capacitor illustrated in FIG. 1.
Figure 3:
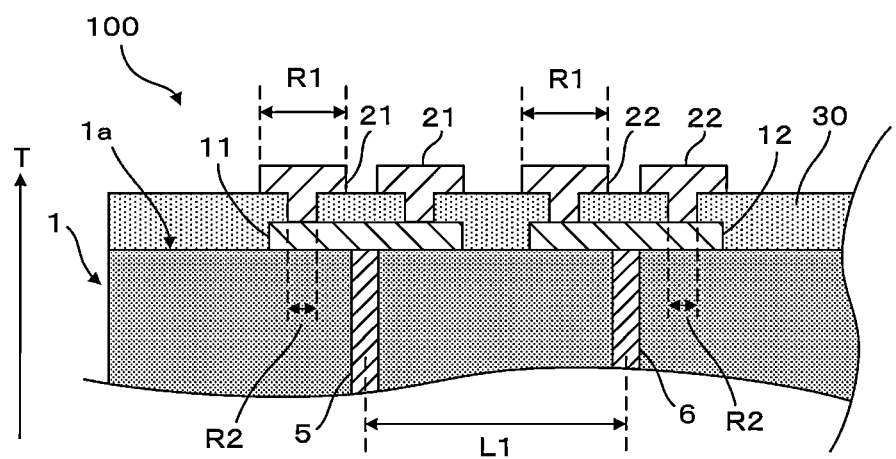
FIG. 3 is an enlarged cross-sectional view of a portion of the multilayer ceramic capacitor illustrated in FIG. 2.

FIG. 1 is a plan view of a multilayer ceramic capacitor 100 according to a preferred embodiment of the present invention. FIG. 2 is a cross-sectional view, taken along a line II-II, of the multilayer ceramic capacitor 100 illustrated in FIG. 1. FIG. 3 is an enlarged cross-sectional view of a portion of the multilayer ceramic capacitor 100 illustrated in FIG. 2.

The multilayer ceramic capacitor 100 includes the following components: a capacitor body 1, first via-conductors 5, second via-conductors 6, first extended electrode portions 11, second extended electrode portions 12, first outer electrodes 21, second outer electrodes 22, and an insulative resin 30.

The capacitor body 1 includes a stack of the following components: a plurality of dielectric layers 2, a plurality of first inner electrodes 3, and a plurality of second inner electrodes 4. More specifically, the capacitor body 1 includes a stack of a plurality of alternate layers of the first and second inner electrodes 3 and 4 with the dielectric layer 2 interposed therebetween.

The dielectric layer 2 may be made of any material. For example, the dielectric layer 2 is made of a ceramic material including a component such as $BaTiO_3$, $CaTiO_3$, $SrTiO_3$, $SrZrO_3$, or $CaZrO_3$ as its major component. A minor component such as, for example, an Mn compound, an Fe compound, a Cr compound, a Co compound, or an Ni compound may be added to such a major component at a content less than that of the major component.

The capacitor body 1 can have any shape. For example, the capacitor body 1 can have a cuboid or substantially cuboid shape. A cuboid or substantially cuboid shape refers to, for example, a shape that is not a perfect cuboid but can be regarded as being generally a cuboid with six outer surfaces, such as a cuboid with rounded corners or edges, or a cuboid with surface irregularities.

Similarly, the capacitor body 1 can have any dimensions. For example, the capacitor body 1 can have the following dimensions: a lengthwise dimension of greater than or equal to about 0.3 mm and less than or equal to about 3.0 mm; a widthwise dimension of greater than or equal to about 0.3 mm and less than or equal to about 3.0 mm; and a dimension of greater than or equal to about 50 μm and less than or equal to about 200 μm in the direction of stacking T (hereinafter referred to simply as "stacking direction T") of the dielectric layer 2, the first inner electrode 3, and the second inner electrode 4.

The first inner electrode 3 and the second inner electrode 4 may be made of any material. For example, the first inner electrode 3 and the second inner electrode 4 include a metal such as Ni, Cu, Ag, Pd, Pt, Fe, Ti, Cr, Sn, or Au, or an alloy or other composite material including such a metal. The first inner electrode 3 and the second inner electrode 4 may include, as a common material, the same ceramic material as the dielectric ceramic material included in the dielectric layer 2. In that case, the first inner electrode 3 and the second inner electrode 4 include the common material at a content of, for example, less than or equal to about 20 vol %.

The first inner electrode 3 and the second inner electrode 4 can have any thickness. For example, the first inner electrode 3 and the second inner electrode 4 can have a thickness on the order of greater than or equal to about 0.3 μm and less than or equal to about 1.0 μm. Any number of layers of the first inner electrode 3, and any number of layers of the second inner electrode 4 can be provided. For example, the sum of the number of layers of the first inner electrodes 3 and the number of layers of the second inner electrodes 4 can be on the order of greater than or equal to 10 and less than or equal to 150. The capacitor body 1 may include an inner electrode electrically connected to neither the first outer electrode 21 nor the second outer electrode 22.

The first inner electrode 3 may include a plurality of first through-holes 3a through which to insert the second via-conductor 6 described later. The second inner electrode 4 may include a plurality of second through-holes 4a through which to insert the first via-conductor 5 described later.

In the multilayer ceramic capacitor 100, the first inner electrode 3 and the second inner electrode 4 face each other with the dielectric layer 2 interposed therebetween. This causes an electrostatic capacitance to be generated.

The first via-conductor 5 is disposed inside the capacitor body 1 so as to extend in the stacking direction T. The first via-conductor 5 is electrically connected to the first inner electrodes 3. The first via-conductor 5 is inserted through the second through-hole 4a of the second inner electrode 4, and insulated from the second inner electrode 4.

The second via-conductor 6 is disposed inside the capacitor body 1 so as to extend in the stacking direction T. The second via-conductors 6 is electrically connected to the second inner electrodes 4. The second via-conductor 6 is inserted through the first through-hole 3a of the first inner electrode 3, and insulated from the first inner electrode 3.

The first via-conductors 5 and the second via-conductors 6 can be provided at any desired locations inside the capacitor body 1. According to the present preferred embodiment, the first via-conductors 5 and the second via-conductors 6 are arranged in matrix configuration.

According to the present preferred embodiment, the first via-conductor 5 and the second via-conductor 6 are exposed on a first outer surface 1a, which is one of the six outer surfaces of the capacitor body 1. Of the six outer surfaces of the capacitor body 1, the first outer surface 1a is one of two major surfaces of the capacitor body 1 that face each other in the stacking direction T.

The first via-conductor 5 and the second via-conductors 6 may be made of any material. For example, the first via-conductor 5 and the second via-conductor 6 include a metal such as Ni, Cu, Ag, Pd, Pt, Fe, Ti, Cr, Sn, or Au, or an alloy or other composite material including such a metal.

The first via-conductor 5 and the second via-conductor 6 can have any shape, for example, a cylindrical or substantially cylindrical shape. In that case, the first via-conductor 5 and the second via-conductor 6 can have a diameter on the order of, for example, greater than or equal to about 30 μm and less than or equal to about 150 μm. The distance between the first via-conductor 5 and the second via-conductor 6 that are adjacent to each other, more specifically, the distance L1 (see FIG. 3) between the center of the first via-conductor 5 and the center of the second via-conductor 6 can be on the order of, for example, greater than or equal to about 50 μm and less than or equal to about 500 μm.

The first extended electrode portion 11 is electrically connected to the first via-conductor 5. The first extended electrode portion 11 is disposed on an outer surface of the capacitor body 1 such that the first extended electrode portion 11 extends to a location different from where the first extended electrode portion 11 is connected to the first via-conductor 5. According to the present preferred embodiment, the first extended electrode portion 11 is disposed on the first outer surface 1a of the capacitor body 1, and directly connected to the first via-conductor 5 exposed on the first outer surface 1a.

The second extended electrode portion 12 is electrically connected to the second via-conductor 6. The second extended electrode portion 12 is disposed on the outer surface of the capacitor body 1 such that the second extended electrode portion 12 extends to a location different from where the second extended electrode portion 12 is connected to the second via-conductor 6. According to the present preferred embodiment, the second extended electrode portion 12 is disposed on the first outer surface 1a of the capacitor body 1, and directly connected to the second via-conductor 6 exposed on the first outer surface 1a.

The first extended electrode portion 11 and the second extended electrode portion 12 can be made of any material. An example of such a material can be Cu. It is to be noted, however, that such a material may be, for example, instead of Cu, a metal such as Ni, Ag, Pd, Pt, Fe, Ti, Cr, Sn, or Au, or an alloy or other composite material including such a metal. The first extended electrode portion 11 and the second extended electrode portion 12 can be a thin film layer with a thickness on the order of, for example, greater than or equal to about 50 nm and less than or equal to about 3 μm.

The first outer electrode 21 is disposed outside the capacitor body 1. The first outer electrode 21 is electrically connected to the first extended electrode portion 11. The first extended electrode portion 11 is electrically connected to the first via-conductor 5, and the first via-conductor 5 is electrically connected to the first inner electrodes 3. The first outer electrode 21 is thus electrically connected to the first inner electrodes 3.

The second outer electrode 22 is disposed outside the capacitor body 1. The second outer electrode 22 is electrically connected to the second extended electrode portion 12. The second extended electrode portion 12 is electrically connected to the second via-conductor 6, and the second via-conductor 6 is electrically connected to the second inner electrodes 4. The second outer electrode 22 is thus electrically connected to the second inner electrodes 4.

According to the present preferred embodiment, the first extended electrode portion 11 and the second extended electrode portion 12 are each disposed on the first outer surface 1a of the capacitor body 1. Similarly, the first outer electrode 21 and the second outer electrode 22 are disposed near the first outer surface 1a of the capacitor body 1. As illustrated in FIG. 1, according to the present preferred embodiment, the first outer electrodes 21 and the second the outer electrodes 22 are arranged in matrix configuration. It is to be noted, however, that the respective numbers of first and second outer electrodes 21 and 22, and the arrangement of the first and second outer electrodes 21 and 22 may be chosen as desired, and not limited to the numbers and the arrangement depicted in FIG. 1. The number of first outer electrodes 21 and the number of second outer electrodes 22 are preferably the same, but may be different.

The first outer electrode 21 and the second outer electrode 22 can be made of any material. An example of such a material can be Cu. It is to be noted, however, that such a material may be, for example, instead of Cu, a metal such as Ni, Ag, Pd, Pt, Fe, Ti, Cr, Sn, or Au, or an alloy or other composite material including such a metal. Plating may be applied to the surfaces of the first and second outer electrodes 21 and 22. The plating can be applied using a metal such as, for example, Cu, Ni, Ag, Pd, Pt, Fe, Ti, Cr, Sn, or Au, or an alloy or other composite material including such a metal. The plating may be applied in a single layer, or may be applied in a plurality of layers.

The insulative resin 30 is disposed on the outside of the capacitor body 1. The insulative resin 30 provides insulation between the first extended electrode portion 11 and the second extended electrode portion 12, and between the first outer electrode 21 and the second outer electrode 22. According to the present preferred embodiment, the insulative resin 30 covers the first extended electrode portion 11 and the second extended electrode portion 12, which are disposed on the first outer surface 1a of the capacitor body 1. More specifically, the insulative resin 30 covers the entirety or substantially the entirety of the first outer surface 1a of the outer surfaces of the capacitor body 1. The first outer surface 1a is an outer surface on which the first extended electrode portion 11 and the second extended electrode portion 12 are disposed.

The insulative resin 30 is, for example, a polyimide resin. It is to be noted, however, that the insulative resin 30 to be used is not necessarily a polyimide resin but may be another insulative resin having photosensitivity. The insulative resin 30 can have a thickness on the order of, for example, greater than or equal to about 1 μm and less than or equal to about 10 μm.

The first outer electrode 21 is disposed above the insulative resin 30. The first outer electrode 21 is connected to the first extended electrode portion 11 by extending through the insulative resin 30. The second outer electrode 22 is disposed above the insulative resin 30. The second outer electrode 22 is connected to the second extended electrode portion 12 by extending through the insulative resin 30. The expression "above the insulative resin 30" means being located above the insulative resin 30 with the location of the capacitor body 1 defined as being below the insulative resin 30.

When viewed in a direction orthogonal or substantially orthogonal to the first outer surface 1a of the capacitor body 1, the first outer electrode 21 and the second outer electrode 22 can have any shape, for example, a circular or substantially circular shape as illustrated in FIG. 1. In that case, the first outer electrode 21 and the second outer electrode 22 can have a diameter R1 (see FIG. 3) on the order of, for example, greater than or equal to about 10 μm and less than or equal to about 150 μm. Similarly, a portion of each of the first and second outer electrodes 21 and 22 that extends through the insulative resin 30 can have any shape, for example, a cylindrical or substantially cylindrical shape. If a portion of each of the first and second outer electrodes 21 and 22 that extends through the insulative resin 30 is cylindrical or substantially cylindrical in shape, the cylindrical portion can have a diameter R2 (see FIG. 3) on the order of, for example, greater than or equal to about 5 μm and less than or equal to about 100 μm.

In the multilayer ceramic capacitor 100 according to the present preferred embodiment, the number of first outer electrodes 21 is greater than the number of first via-conductors 5, and the number of second outer electrodes 22 is greater than the number of second via-conductors 6. That is, at least one first via-conductor 5 of the first via-conductors 5 is electrically connected to a plurality of the first outer electrodes 21. At least one second via-conductor 6 of the second via-conductors 6 is electrically connected to a plurality of the second outer electrodes 22. The configuration described above makes it possible to increase the number of first outer electrodes 21 and the number of second outer electrodes 22 without increasing the number of first via-conductors 5 and the number of second via-conductors 6, respectively. According to the present preferred embodiment, each of the first via-conductors 5 is electrically connected to a plurality of the first outer electrodes 21, and each of the second via-conductors 6 is electrically connected to a plurality of the second outer electrodes 22.

Preferably, the number of first outer electrodes 21 is greater than or equal to four times the number of first via-conductors 5, and the number of second outer electrodes 22 is greater or equal to four times the number of second via-conductors 6. This configuration allows for placement of an increased number of first outer electrodes 21 and an increased number of second outer electrodes 22, without increasing the number of first via-conductors 5 and the number of second via-conductors 6, respectively.

The multilayer ceramic capacitor 100 according to the present preferred embodiment is configured such that current flows through a route that includes a large number of first via-conductors 5 connected in parallel and a large number of second via-conductors 6 connected in parallel, and that has the shortest possible length. This results in low ESL. The multilayer ceramic capacitor 100 is also configured such that the magnetic field generated by the current flowing in the first via-conductor 5, and the magnetic field generated by the current flowing in the second via-conductor 6 cancel each other out. This results in low ESL.

Figure 4:
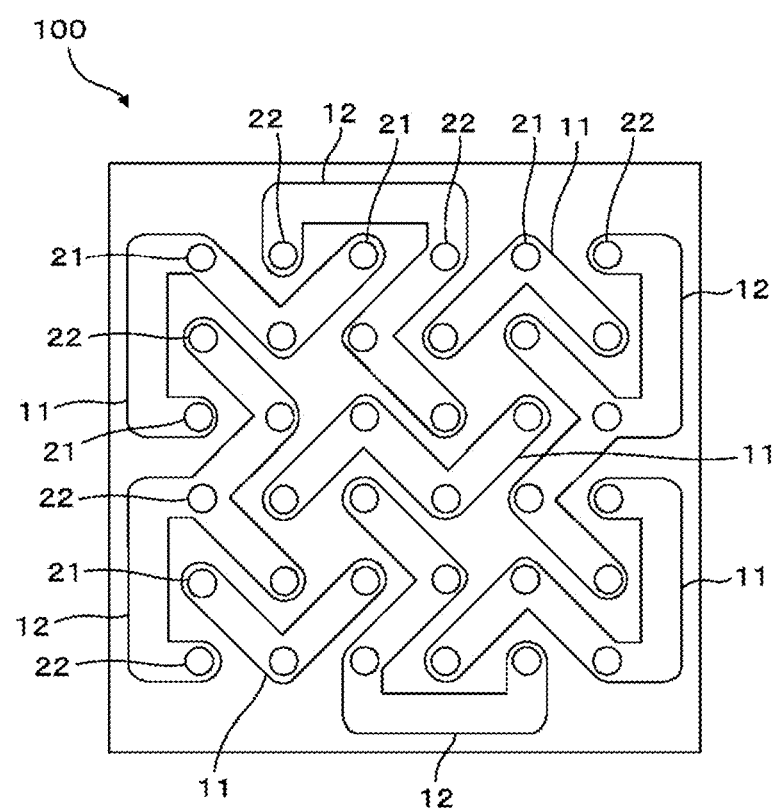
FIG. 4 illustrates an example of the wiring pattern of first and second extended electrode portions when the number of outer electrodes is 36.

FIG. 4 illustrates an example of the wiring pattern of the first and second extended electrode portions 11 and 12. FIG. 4 illustrates 18 first outer electrodes 21 and 18 second outer electrodes 22 together with the extended electrode portions. As illustrated in FIG. 4, each of the first extended electrode portion 11 and the second extended electrode portion 12 is provided as a linearly extending wiring pattern. Since the first extended electrode portion 11 is provided as a linearly extending wiring pattern, the first extended electrode portion 11 can be structured in any shape. This allows the first outer electrode 21 to be easily placed at any desired location. Similarly, since the second extended electrode portion 12 is provided as a linearly extending wiring pattern, the second extended electrode portion 12 can be configured in any shape. This allows the second outer electrode 22 to be easily placed at any desired location. The first extended electrode portion 11 and the second extended electrode portion 12, which extend linearly, can have a width on the order of, for example, greater than or equal to about 5 μm and less than or equal to about 100 μm.

The wiring pattern illustrated in FIG. 4 includes five first extended electrode portions 11, and four second extended electrode portions 12. Although not illustrated in FIG. 4, the number of first via-conductors 5 provided is the same as the number of first extended electrode portions 11, that is, five, and the number of second via-conductors 6 provided is the same as the number of second extended electrode portions 12, that is, four. As illustrated in FIG. 4, each single first extended electrode portion 11 is electrically connected to 3 or 4 first outer electrodes 21, and each single second extended electrode portion 12 is electrically connected to 4 or 5 second outer electrodes 22.

Figure 5:
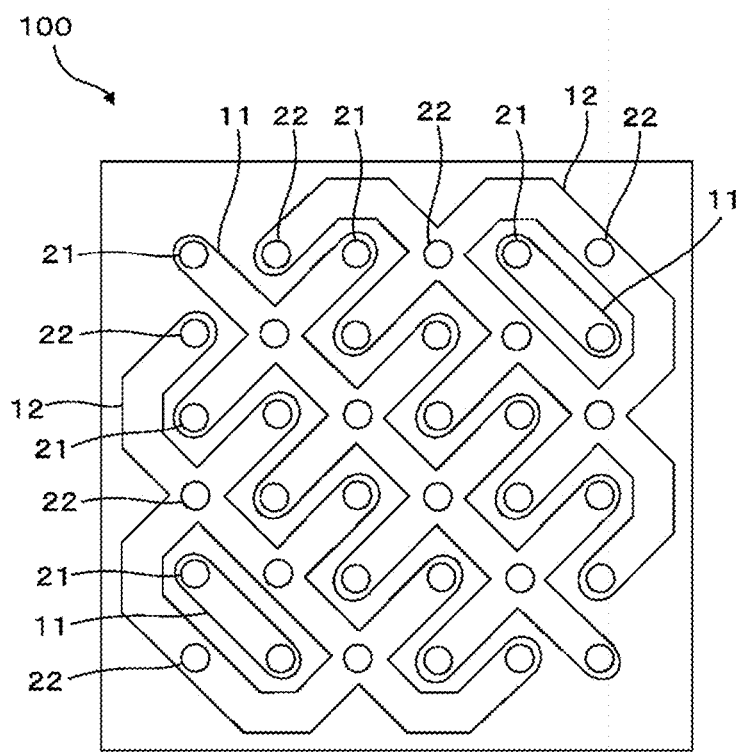
FIG. 5 illustrates another example of the wiring pattern of first and second extended electrode portions when the number of outer electrodes is 36.

FIG. 5 illustrates another example of the wiring pattern of the first and second extended electrode portions 11 and 12. FIG. 5 illustrates 18 first outer electrodes 21 and 18 second outer electrodes 22 together with the extended electrode portions. The wiring pattern illustrated in FIG. 5 includes three first extended electrode portions 11, and two second extended electrode portions 12. As illustrated in FIG. 5, each single first extended electrode portion 11 is electrically connected to two or 14 first outer electrodes 21, and each single second extended electrode portion 12 is electrically connected to nine second outer electrodes 22.

In the case of a configuration in which a single first via-conductor 5 is electrically connected to each single first extended electrode portion 11 and a single second via-conductor 6 is electrically connected to each single second extended electrode portion 12, reducing the number of first extended electrode portions 11 and the number of second extended electrode portions 12 makes it possible to reduce the number of first via-conductors 5 and the number of second via-conductors 6. This results in increased electrostatic capacitance as will be described later. In this regard, the wiring pattern illustrated in FIG. 5 includes fewer first extended electrode portions 11 and fewer second extended electrode portions 12 than does the wiring pattern illustrated in FIG. 4. Therefore, the above-described configuration for the wiring pattern illustrated in FIG. 5 makes it possible to reduce the number of first via-conductors 5 and the number of second via-conductors 6, and consequently increase electrostatic capacitance.

Figure 6:
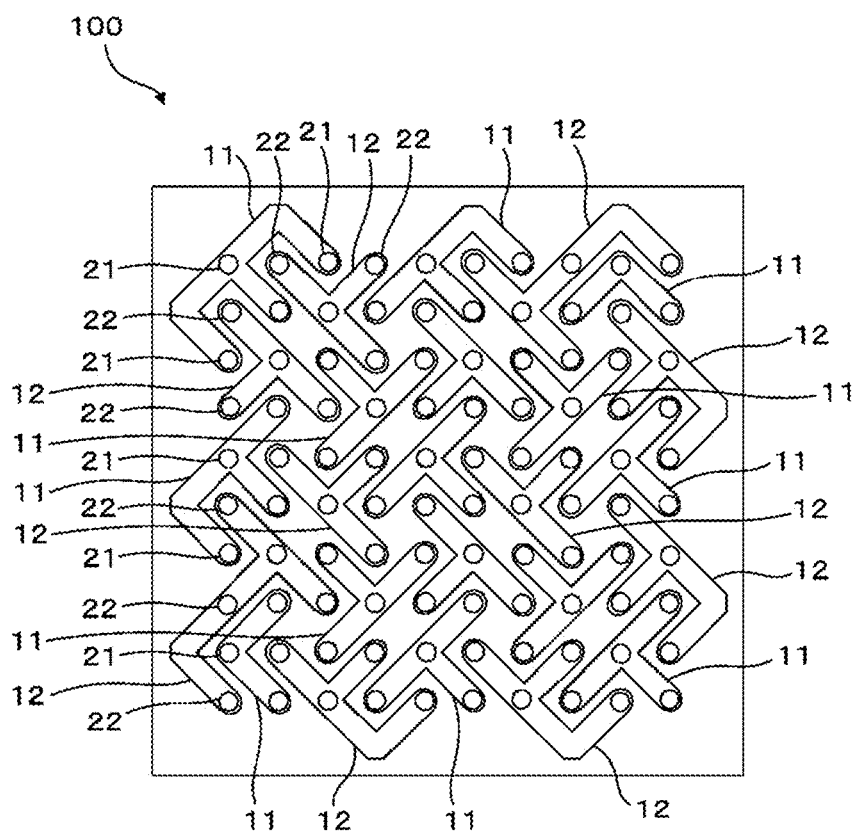
FIG. 6 illustrates an example of the wiring pattern of first and second extended electrode portions when the number of outer electrodes is 100.
Figure 7:
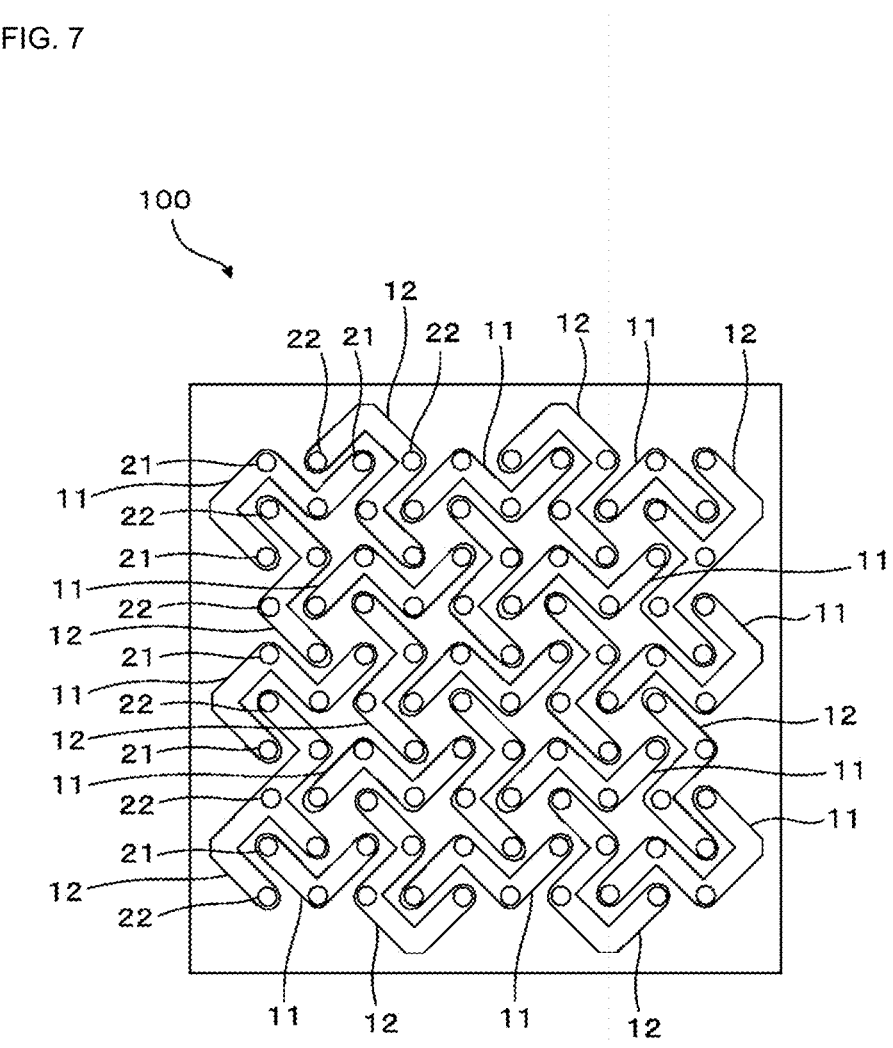
FIG. 7 illustrates another example of the wiring pattern of first and second extended electrode portions when the number of outer electrodes is 100.
Figure 8:
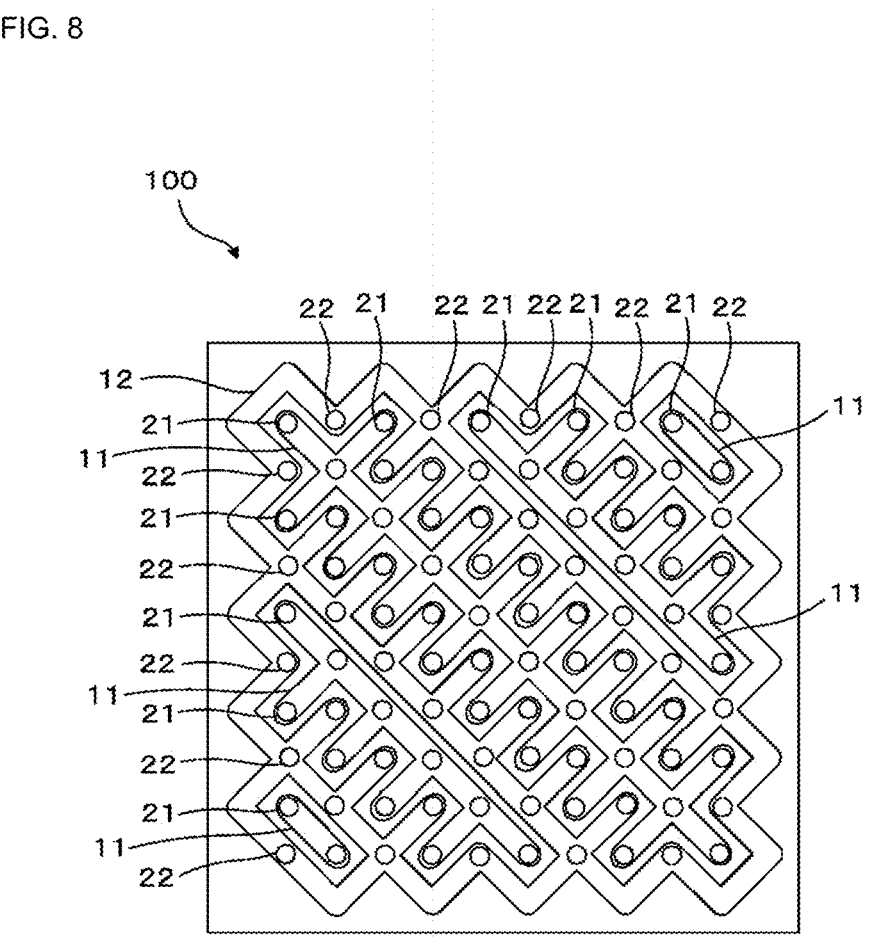
FIG. 8 illustrates still another example of the wiring pattern of first and second extended electrode portions when the number of outer electrodes is 100.

FIGS. 4 and 5 each illustrate an example of the wiring pattern of the first and second extended electrode portions 11 and 12 when the sum of the number of first outer electrodes 21 and the number of second outer electrodes 22 is 36. In contrast, FIGS. 6 to 8 each illustrate an example of the wiring pattern of the first and second extended electrode portions 11 and 12 when the sum of the number of first outer electrodes 21 and the number of second outer electrodes 22 is 100. FIGS. 6 to 8 illustrate the first outer electrodes 21 and the second outer electrodes 22 together with the extended electrode portions. Although not illustrated in FIGS. 6 to 8, 13 first via-conductors 5, and 12 second via-conductors 6 are provided.

The wiring pattern illustrated in FIG. 6 includes 13 first extended electrode portions 11, and 12 second extended electrode portions 12. As illustrated in FIG. 6, each single first extended electrode portion 11 is electrically connected to three or four first outer electrodes 21, and each single second extended electrode portion 12 is electrically connected to four or five second outer electrodes 22.

The wiring pattern illustrated in FIG. 7 includes 13 first extended electrode portions 11, and 12 second extended electrode portions 12. As illustrated in FIG. 7, each single first extended electrode portion 11 is electrically connected to three or four first outer electrodes 21, and each single second extended electrode portion 12 is electrically connected to four or five second outer electrodes 22.

The wiring pattern illustrated in FIG. 8 includes five first extended electrode portions 11, and a single second extended electrode portion 12. As illustrated in FIG. 8, each single first extended electrode portion 11 is electrically connected to two, 10, or 26 first outer electrodes 21, and the single second extended electrode portion 12 is electrically connected to 50 second outer electrodes 22.

Of the wiring patterns illustrated in FIGS. 6 to 8, the wiring pattern illustrated in FIG. 8 includes the smallest number of first extended electrode portions 11 and the smallest number of second extended electrode portions 12. Accordingly, in the case of a configuration in which a single first via-conductor 5 is electrically connected to each single first extended electrode portion 11 and a single second via-conductor 6 is electrically connected to each single second extended electrode portion 12, the wiring pattern illustrated in FIG. 8 allows for the smallest number of first via-conductors 5 and the smallest number of second via-conductors 6, and consequently the greatest electrostatic capacitance.

Possible wiring patterns of the first and second extended electrode portions 11 and 12 are not limited to the wiring patterns illustrated in FIGS. 4 to 8.

The configuration of the multilayer ceramic capacitor 100 according to the present preferred embodiment makes it possible to place the first outer electrode 21 at any desired location different from a location where the first via-conductor 5 is exposed on the outer surface of the capacitor body 1, and to place the second outer electrode 22 at any desired location different from a location where the second via-conductor 6 is exposed on the outer surface of the capacitor body 1. That is, according to the above-described configuration, the first extended electrode portion 11 and the second extended electrode portion 12 are disposed on the outer surface of the capacitor body 1. The first extended electrode portion 11 extends from a location where the first via-conductor 5 is exposed on the outer surface to a desired location where the first outer electrode 21 is to be provided. The second extended electrode portion 12 extends from a location where the second via-conductor 6 is exposed on the outer surface to a desired location where the second outer electrode 22 is to be provided. As a result, even if the capacitor body 1 has the same uniform or substantially uniform structure, the first outer electrode 21 and the second outer electrode 22 can be provided at any desired locations. This makes it possible to provide the multilayer ceramic capacitor 100 in which any desired number of first outer electrodes 21 and any desired number of second outer electrodes 22 are disposed at any desired locations, in accordance with the specifications of a substrate to which to mount the multilayer ceramic capacitor 100.

The configuration of the multilayer ceramic capacitor 100 according to the present preferred embodiment makes it possible to reduce or prevent a decrease in the electrostatic capacitance of the multilayer ceramic capacitor 100 even when, for example, the specifications of a substrate to which to mount the multilayer ceramic capacitor 100 require that the number of first outer electrodes 21 and the number of second outer electrodes 22 be increased. This is explained below with reference to FIGS. 9A to 9C.

FIG. 9A schematically illustrates, in cross-section, the structure of a conventional multilayer ceramic capacitor 100s, in which first outer electrodes 21s are disposed at locations where the corresponding first via-conductors 5s are exposed on an outer surface of a capacitor body is, and in which second outer electrodes 22s are disposed at locations where the corresponding second via-conductors 6s are exposed on the outer surface of the capacitor body is. The capacitor body is includes a stack of the following components: a plurality of dielectric layers 2s, a plurality of first inner electrodes 3s, and a plurality of second inner electrodes 4s.

FIG. 9B schematically illustrates, in cross-section, the structure of a conventional multilayer ceramic capacitor 100t, in which the number of first outer electrodes 21s and the number of second outer electrodes 22s are doubled compared with the multilayer ceramic capacitor 100s illustrated in FIG. 9A. As compared with the multilayer ceramic capacitor 100s illustrated in FIG. 9A, the number of first outer electrodes 21s and the number of second outer electrodes 22s are doubled as described above, and thus the number of first via-conductors 5s and the number of second via-conductors 6s are also doubled. As compared with the multilayer ceramic capacitor 100s illustrated in FIG. 9A, the above-described configuration of the multilayer ceramic capacitor 100t illustrated in FIG. 9B results in reduced effective area where the first inner electrode 3s and the second inner electrode 4s face each other, which leads to decreased electrostatic capacitance.

FIG. 9C schematically illustrates, in cross-section, the structure of the multilayer ceramic capacitor 100 according to the present preferred embodiment. The configuration of the multilayer ceramic capacitor 100 according to the present preferred embodiment illustrated in FIG. 9C allows the multilayer ceramic capacitor 100 to have twice as many first outer electrodes 21 and twice as many second outer electrodes 22, but the same number of first via-conductors 5 and the same number of second via-conductors 6, as the multilayer ceramic capacitor 100s illustrated in FIG. 9A. This configuration therefore makes it possible to reduce or prevent a decrease in electrostatic capacitance even when the number of first outer electrodes 21 and the number of second outer electrodes 22 are increased.

In the multilayer ceramic capacitor 100 according to the present preferred embodiment, the insulative resin 30 covers the entirety or substantially the entirety of an outer surface of the outer surfaces of the capacitor body 1. The outer surface is an outer surface on which the first extended electrode portion 11 and the second extended electrode portion 12 are disposed. This helps to reduce or prevent cracking caused by application of external force. That is, the insulative resin 30 has a low Young's modulus relative to the ceramic material of the capacitor body 1, which means that the insulative resin 30 undergoes elastic deformation when subjected to external force. This helps to reduce or prevent cracking of the multilayer ceramic capacitor 100. Since a capacitor with a small thickness in the stacking direction T relative to its dimensions in the lengthwise and widthwise directions is particularly susceptible to cracking, the cracking reduction effect due to the presence of the insulative resin 30 becomes particularly pronounced for the multilayer ceramic capacitor 100 with a small thickness.

Method for Manufacturing Multilayer Ceramic Capacitor

An exemplary method for manufacturing the multilayer ceramic capacitor 100 according to a preferred embodiment of the present invention is described below.

First, a ceramic green sheet, and an inner-electrode conductive paste for forming an inner electrode are prepared. The ceramic green sheet to be used may be a known ceramic green sheet. The ceramic green sheet can be obtained by, for example, coating a base material with a ceramic slurry including ceramic powder, a resin component, and a solvent, and drying the ceramic slurry.

The inner-electrode conductive paste contains particles made of a metal such as, for example, Ni, Cu, Ag, Pd, Pt, Fe, Ti, Cr, Sn, or Au, or a precursor thereof, and a solvent. The inner-electrode conductive paste may further include, for example, a resin component defining and functioning as a dispersant or binder.

Subsequently, the inner-electrode conductive paste is applied onto the ceramic green sheet to form an inner electrode pattern.

Subsequently, a predetermined number of ceramic green sheets with no inner electrode pattern formed thereon are stacked. Then, on top of the resulting stack, ceramic green sheets with an inner electrode pattern formed thereon are sequentially stacked. Then, on top of the resulting stack, a predetermined number of ceramic green sheets with no inner electrode pattern formed thereon are stacked to thereby produce a mother multilayer body. The mother multilayer body is a multilayer body from which to produce a plurality of multilayer ceramic capacitors 100 at once. The mother multilayer body thus produced is subjected to pressing by a method such as, for example, using a rigid body press, an isostatic press, or other methods.

Subsequently, a through-hole for forming the first via-conductor 5, and a through-hole for forming the second via-conductor 6 are formed in the mother multilayer body. The through-holes are formed by, for example, laser beam radiation.

Subsequently, the through-holes thus formed are filled with a conductive paste for forming the first via-conductor 5 and the second via-conductor 6. The conductive paste includes, for example, particles made of a metal such as Ni, Cu, Ag, Pd, Pt, Fe, Ti, Cr, Sn, or Au, or a precursor thereof, and a solvent. The conductive paste may further include, for example, a resin component serving as a dispersant or binder.

Subsequently, the mother multilayer body is cut by a cutting method such as, for example, press-cutting, cutting with a dicing machine, or laser cutting into pieces of a predetermined size to provide each individual multilayer chip. The obtained multilayer chip is then fired according to a predetermined profile to provide the capacitor body 1.

Figure 10A:
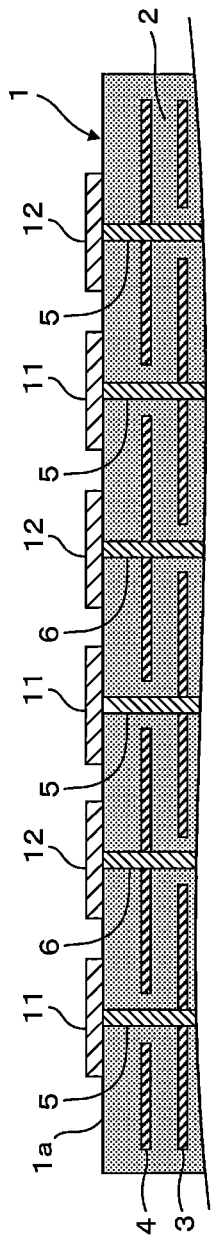
FIGS. 10A to 10C are illustrations for explaining a method for manufacturing a multilayer ceramic capacitor according to a preferred embodiment of the present invention.

Subsequently, the first extended electrode portion 11 and the second extended electrode portion 12 are formed on the first outer surface 1a of the capacitor body 1 (FIG. 10A). The first extended electrode portion 11 and the second extended electrode portion 12 can be formed by, for example, sputtering. More specifically, an electrode film for forming the first extended electrode portion 11 and the second extended electrode portion 12 is formed on the first outer surface 1a of the capacitor body 1 by, for example, sputtering. Then, through known steps such as, for example, asking, film-resist formation, exposure, developing, etching, and resist removal, the first extended electrode portion 11 electrically connected to the first via-conductor 5, and the second extended electrode portion 12 electrically connected to the second via-conductor 6 are formed. If Cu is to be used as the first extended electrode portion 11 and the second extended electrode portion 12, for example, after sputtering with Ti is performed to form an adhesion layer, sputtering with Cu may be performed.

Figure 10B:
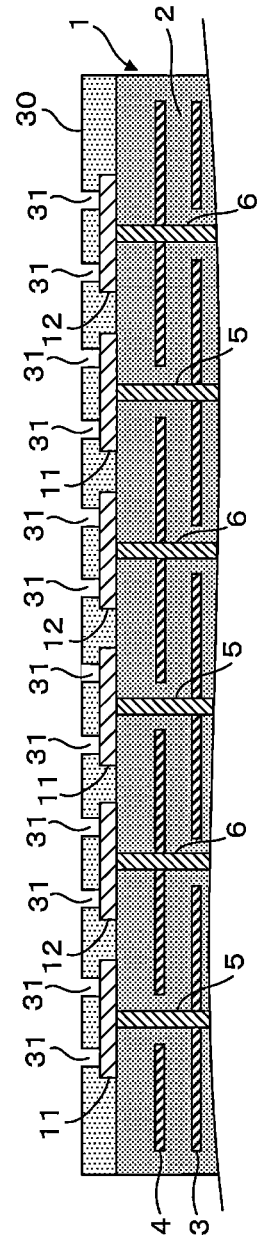

Subsequently, the insulative resin 30 is disposed so as to cover the first extended electrode portion 11 and the second extended electrode portion 12. Further, holes 31 for forming the first outer electrode 21 and the second outer electrode 22 are formed inside the insulative resin 30 (FIG. 10B). As seen in a direction perpendicular or substantially perpendicular to the first outer surface 1a of the capacitor body 1, the hole 31 for forming the first outer electrode 21 is positioned to at least partially overlap the first extended electrode portion 11, and the hole 31 for forming the second outer electrode 22 is positioned to at least partially overlap the second extended electrode portion 12. More specifically, the insulative resin 30 is applied so as to cover the first extended electrode portion 11 and the second extended electrode portion 12, and then through known steps such as, for example, exposure, developing, and curing for setting the resin, the insulative resin 30 with the hole 31 formed therein is disposed.

Figure 10C:
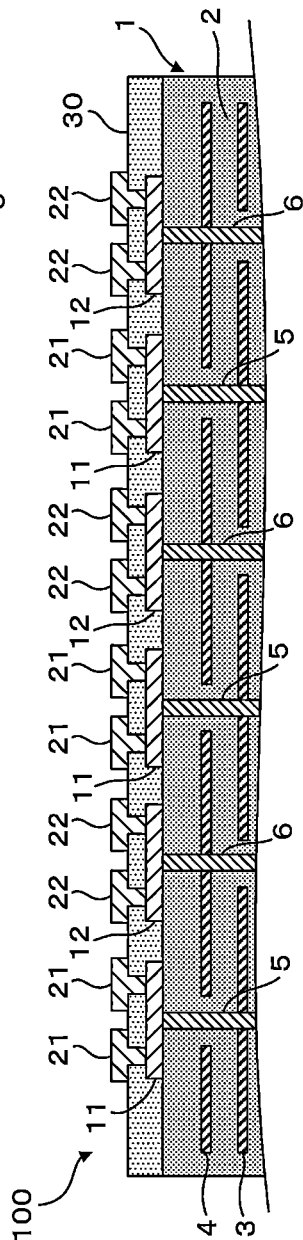

Lastly, the first outer electrode 21 and the second outer electrode 22 are formed (FIG. 10C). The first outer electrode 21 and the second outer electrode 22 can be formed by, for example, sputtering. More specifically, an electrode film for forming the first outer electrode 21 and the second outer electrode 22 is formed on the insulative resin 30 by, for example, sputtering. After plating is applied onto the electrode film, the first outer electrode 21 and the second outer electrode 22 are formed through known steps such as, for example, film-resist formation, exposure, developing, etching, and resist removal. If Cu is to be used as the first outer electrode 21 and the second outer electrode 22, for example, after sputtering with Ti is performed to form an adhesion layer, sputtering with Cu may be performed.

The present invention is not limited to the above-described preferred embodiment but allows various alterations and modifications to be made within the scope of the present invention.

For example, in the multilayer ceramic capacitor 100 according to the preferred embodiment described above, the first extended electrode portion 11 and the second extended electrode portion 12 are disposed on an outer surface of the capacitor body 1. Alternatively, a resin layer may be disposed on an outer surface of the capacitor body 1, and the first extended electrode portion 11 and the second extended electrode portion 12 may be disposed above the resin layer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a capacitor body including a plurality of dielectric layers, a plurality of first inner electrodes, and a plurality of second inner electrodes that are stacked in a stacking direction, and first and second outer surfaces that face each other in the stacking direction;
   at least one first via-conductor inside the capacitor body and electrically connected to the first inner electrodes;
   at least one second via-conductor inside the capacitor body and electrically connected to the second inner electrodes;

a first extended electrode portion electrically connected to the at least one first via-conductor and provided on one of the first and second outer surfaces of the capacitor body such that the first extended electrode portion extends to a location different from a location at which the first extended electrode portion is connected to the at least one first via-conductor;

a second extended electrode portion electrically connected to the at least one second via-conductor and provided on the one of the first and second outer surfaces of the capacitor body such that the second extended electrode portion extends to a location different from a location at which the second extended electrode portion is connected to the at least one second via-conductor;

a plurality of first outer electrodes electrically connected to the first extended electrode portion at the one of the first and second outer surfaces of the capacitor body;

a plurality of second outer electrodes electrically connected to the second extended electrode portion at the one of the first and second outer surfaces of the capacitor body; and an insulative resin providing insulation between the first extended electrode portion and the second extended electrode portion, and between the plurality of first outer electrodes and the plurality of second outer electrodes; wherein a number of the plurality of first outer electrodes electrically connected to the first extended electrode portion at the one of the first and second outer surfaces of the capacitor body is greater than a number of the at least one first via-conductor; and a number of the plurality of second outer electrodes electrically connected to the second extended electrode portion at the one of the first and second outer surfaces of the capacitor body is greater than a number of the at least one second via-conductor.

2. The multilayer ceramic capacitor according to claim 1, wherein
the insulative resin covers the first extended electrode portion and the second extended electrode portion;
the plurality of first outer electrodes are located above the insulative resin and connected to the first extended electrode portion by extending through the insulative resin; and
the plurality of second outer electrodes are located above the insulative resin and connected to the second extended electrode portion by extending through the insulative resin.

3. The multilayer ceramic capacitor according to claim 1, wherein
the insulative resin covers an entirety or substantially an entirety of the one of the first and second outer surfaces on which the first extended electrode portion and the second extended electrode portion are provided.

4. The multilayer ceramic capacitor according to claim 1, wherein each of the first extended electrode portion and the second extended electrode portion includes a wiring pattern that extends linearly.

5. The multilayer ceramic capacitor according to claim 1, wherein the insulative resin is a polyimide resin.

6. The multilayer ceramic capacitor according to claim 1, wherein each of the plurality of dielectric layers includes $BaTiO_3$, $CaTiO_3$, $SrTiO_3$, $SrZrO_3$, or $CaZrO_3$ as a major component.

7. The multilayer ceramic capacitor according to claim 6, wherein each of the plurality of dielectric layers includes an Mn compound, an Fe compound, a Cr compound, a Co compound, or an Ni compound as a sub-component.

8. The multilayer ceramic capacitor according to claim 1, wherein the capacitor body has a lengthwise dimension of greater than or equal to about 0.3 mm and less than or equal to about 3.0 mm, a widthwise dimension of greater than or equal to about 0.3 mm and less than or equal to about 3.0 mm, and a dimension of greater than or equal to about 50 μm and less than or equal to about 200 μm in a stacking direction.

9. The multilayer ceramic capacitor according to claim 1, wherein each of the plurality of first and second inner electrodes includes Ni, Cu, Ag, Pd, Pt, Fe, Ti, Cr, Sn, or Au, or an alloy or other composite material including Ni, Cu, Ag, Pd, Pt, Fe, Ti, Cr, Sn, or Au.

10. The multilayer ceramic capacitor according to claim 1, wherein a thickness of each of the plurality of first and second inner electrodes greater than or equal to about 0.3 μm and less than or equal to about 1.0 μm.

11. The multilayer ceramic capacitor according to claim 1, wherein a sum of the plurality of first and second inner electrodes is greater than or equal to 10 and less than or equal to 150.

12. The multilayer ceramic capacitor according to claim 1, wherein each of the first and second via-conductors includes Ni, Cu, Ag, Pd, Pt, Fe, Ti, Cr, Sn, or Au, or an alloy or other composite material including Ni, Cu, Ag, Pd, Pt, Fe, Ti, Cr, Sn, or Au.

13. The multilayer ceramic capacitor according to claim 1, wherein each of the first and second via-conductors has a cylindrical or substantially cylindrical shape.

14. The multilayer ceramic capacitor according to claim 13, wherein each of the first and second via-conductors has a diameter of greater than or equal to about 30 μm and less than or equal to about 150 μm.

15. The multilayer ceramic capacitor according to claim 1, wherein a distance between centers of the first and second via-conductors is greater than or equal to about 50 μm and less than or equal to about 500 μm.

16. The multilayer ceramic capacitor according to claim 1, wherein each of the first and second extended electrode portions includes Ni, Ag, Pd, Pt, Fe, Ti, Cr, Sn, or Au, or an alloy or other composite material including Ni, Ag, Pd, Pt, Fe, Ti, Cr, Sn, or Au.

17. The multilayer ceramic capacitor according to claim 1, wherein
the number of the first outer electrodes is greater than or equal to four times the number of the at least one first via-conductor; and
the number of the second outer electrode is greater than or equal to four times the number of the at least one second via-conductor.

18. The multilayer ceramic capacitor according to claim 1, wherein each of the first and second extended electrode portions has a thickness of greater than or equal to about 50 nm and less than or equal to about 3 μm.

19. A multilayer ceramic capacitor comprising:
a capacitor body including a plurality of dielectric layers, a plurality of first inner electrodes, and a plurality of second inner electrodes that are stacked;
a first via-conductor inside the capacitor body and electrically connected to the first inner electrodes;
a second via-conductor inside the capacitor body and electrically connected to the second inner electrodes;
a first extended electrode portion electrically connected to the first via-conductor and provided on an outer surface of the capacitor body such that the first extended electrode portion extends to a location different from a location at which the first extended electrode portion is connected to the first via-conductor;

a second extended electrode portion electrically connected to the second via-conductor and provided on the outer surface of the capacitor body such that the second extended electrode portion extends to a location different from a location at which the second extended electrode portion is connected to the second via-conductor;

a first outer electrode electrically connected to the first extended electrode portion;

a second outer electrode electrically connected to the second extended electrode portion; and an insulative resin providing insulation between the first extended electrode portion and the second extended electrode portion, and between the first outer electrode and the second outer electrode; wherein a number of the first outer electrodes is greater than or equal to four times a number of the first via-conductors; and a number of the second outer electrode is greater than or equal to four times a number of the second via-conductors.

20. A multilayer ceramic capacitor comprising:

a capacitor body including a plurality of dielectric layers, a plurality of first inner electrodes, and a plurality of second inner electrodes that are stacked;

a first via-conductor inside the capacitor body and electrically connected to the first inner electrodes;

a second via-conductor inside the capacitor body and electrically connected to the second inner electrodes;

a first extended electrode portion electrically connected to the first via-conductor and provided on an outer surface of the capacitor body such that the first extended electrode portion extends to a location different from a location at which the first extended electrode portion is connected to the first via-conductor;

a second extended electrode portion electrically connected to the second via-conductor and provided on the outer surface of the capacitor body such that the second extended electrode portion extends to a location different from a location at which the second extended electrode portion is connected to the second via-conductor;

a first outer electrode electrically connected to the first extended electrode portion;

a second outer electrode electrically connected to the second extended electrode portion; and an insulative resin providing insulation between the first extended electrode portion and the second extended electrode portion, and between the first outer electrode and the second outer electrode; wherein each of the first and second extended electrode portions has a thickness of greater than or equal to about 50 nm and less than or equal to about 3 $\mu$m.

* * * * *